Dec. 12, 1950 — J. H. GRUVER — 2,533,366
RECORD CONTROLLED EMBOSSING MACHINE
Filed Nov. 1, 1947 — 6 Sheets-Sheet 1

Fig. 1

Inventor
John H. Gruver
By Wallace and Cannon
Attorneys

Inventor
John H. Gruver
By Wallace and Cannon
Attorneys

Fig. 7

Patented Dec. 12, 1950

2,533,366

UNITED STATES PATENT OFFICE 2,533,366

RECORD CONTROLLED EMBOSSING
MACHINE

John H. Gruver, East Cleveland, Ohio, assignor to Addressograph-Multigraph Corporation, Wilmington, Del., a corporation of Delaware Application November 1, 1947, Serial No. 783,588

12 Claims. (Cl. 197—20)

1

This invention relates to embossing machines for producing embossed printing plates and the like and particularly it relates to the automatic control of such machines whereby all of the required machine operations may be performed under control of a record member such as a perforated tape or the like.

In my copending application, Serial No. 705,265, filed October 24, 1946 and since issued as Patent No. 2,463,690, dated March 8, 1949, a key operated embossing machine is illustrated and described wherein the various plate loading and handling operations are performed by power means under control of appropriate control keys, and the primary object of the present invention is to enable machines of the character therein shown to be readily and easily controlled by automatic record governed control means. Other objects related to the foregoing are to simplify the application of such automatic control means to such an embossing machine; to enable standard commercial tape reading or like mechanisms to be simply and easily related in an automatic controlling relation to such an embossing machine; and to so relate such control mechanism to the embossing machine as to insure accurate and satisfactory operation of the unit as a whole.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

2

Figure 1:
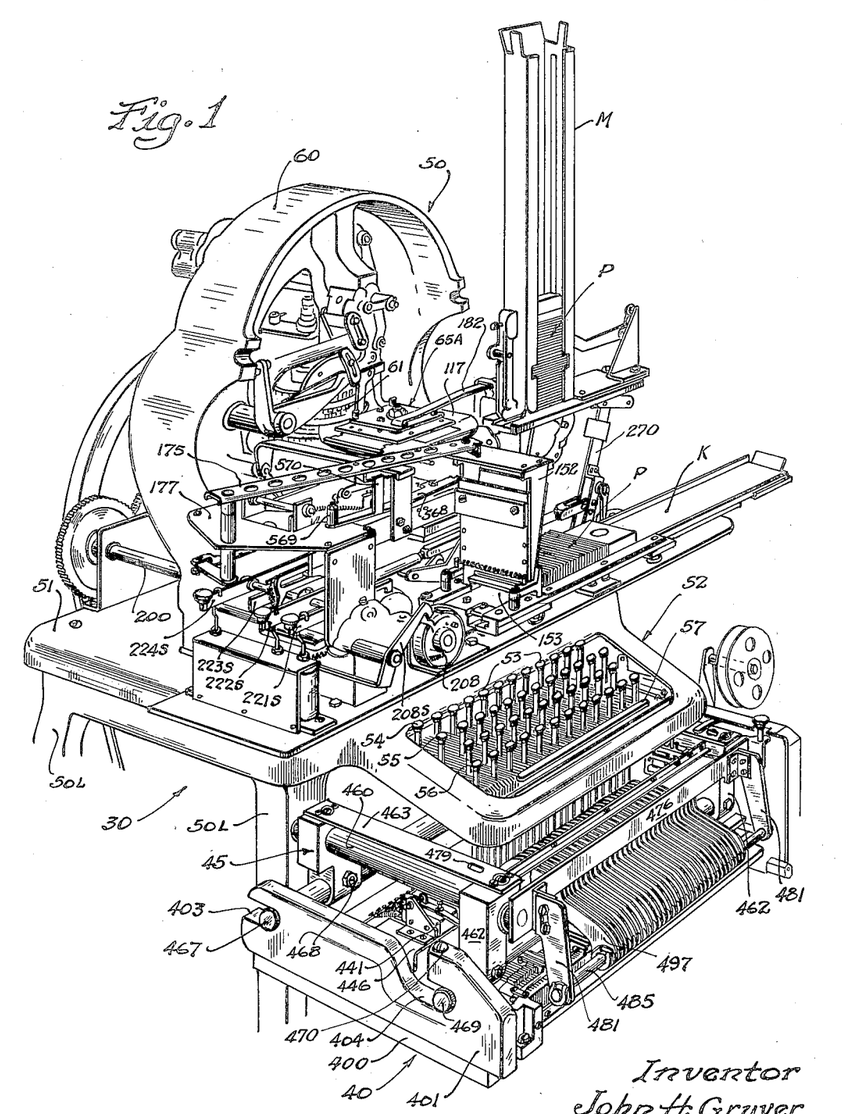
Fig. 1 is a fragmentary perspective view of an automatically controlled embossing machine embodying the features of the invention.

For purposes of disclosure the invention is herein illustrated as embodied in an automatically controlled embossing unit 30 comprising a key operated embossing machine 50 with a tape-reading unit 40 operatively related to the embossing machine 50 through an intermediate mechanical transmitting unit 45, and electrical control connections that will hereinafter be described. The embossing machine 50 is of the construction shown in my aforesaid copending application wherein the embossing machine 50 embodies means for automatically feeding printing plates P from a magazine M and into position for performance of the desired embossing operations thereon, and for thereafter automatically discharging the completed printing plates P from the plate holding carriage and into a collecting magazine K, as shown in Fig. 1 of the drawings. The embossing machine 50 embodies an upstanding frame 51 carried on supporting legs 50L, and along the forward edge of the frame 51 a keyboard 52 is afforded having alphabetical and number keys 53, special control keys 54, 55 and 56 and a space bar 57.

The embossing machine 50 has an upstanding hollow frame 60 carried on the bed 51 and a plurality of character forming punch and die pairs are carried within this frame in rotatable carrier heads 61 for setting operation under control of the keys 53; and as explained in my aforesaid copending application, such selection and setting of a particular die pair initiates an embossing operation in respect to a printing plate P supported at embossing position by a carriage and cross slide structure 65A. This structure, as disclosed in my aforesaid copending application, but not shown in detail herein, includes a longitudinally reciprocable carriage 65 that is spring urged toward the right in Fig. 1 and is escapement controlled to attain an automatic character spacing movement to the right as an incident to each embossing operation. In the following detailed description reference is made to certain elements by use of the reference characters used in my aforesaid copending application, and where possible such elements have been identified in the accompanying drawings so as to enable the structure of the prior application to be found in the present drawings. The present drawings have been kept at the minimum consistent with a proper understanding of the invention. Thus, on the carriage 65, as thus shown in my aforesaid copending application, a cross slide 70 is mounted for line spacing movement in a rearward direction, and this cross slide has a four-station indexing work holding turret 117 mounted thereon.

The carriage 65 is released so that it may move to the right to a loading position, and when the cross slide 70 is released so that it moves to its most forward position, the turret 117 is disposed adjacent and in an operative relation with respect to the plate loading and unloading means. Thus, as described in my aforesaid copending application, a work ejecting arm 175 may be moved to the rear to engage a completed plate P, and may then be returned in a forward direction to the position of Fig. 1 to thereby remove such plate from the turret 117 and discharge the same into a chute 152 that leads downwardly to the packer mechanism 153 and the collecting magazine K. At the same time, a plate feed slide beneath the magazine M may be advanced to the left by means including a lever 270 to feed a new plate P into another work holding position on the turret 117.

The carriage 65 may then be returned to the left to an initial or starting position by means including a carriage return arm 317 as described in my aforesaid copending application, and as an incident to this operation, a turret advancing lever 182 is rendered effective to cause indexing of the turret 117.

The carriage return, plate loading and unloading operations, and the carriage return operation as thus described as well as the plate packing operation, the line spacing operation and the carriage release operation are all performed by power means, as set forth in my aforesaid copending application, and such power means are driven from a main shaft 200 under selective control of a plurality of one revolution clutches such as the clutch 208 which drives the plate packer 153. Thus a clutch for operating the carriage return lever 317 is governed by a stop lever 224S, a clutch for operating the plate loading and unloading arms 270 and 175, is governed by a stop lever 223S, a clutch for operating the carriage release means is governed by a stop lever 222S, a clutch for operating the line space means is governed by a stop lever 221S, while a stop lever 208S governs the packer clutch 208.

As described in my aforesaid copending application, the several clutches are provided with mechanical inter-connections so as to cause overlapping sequential operation in certain instances. Thus, upon completion of a particular printing plate P, operation of the stop lever 222S causes the carriage release mechanism to function to not only release the carriage 65 for movement to the right, but also to release the cross slide 70 to cause forward return movement thereof, and when this mechanism has substantially completed its cycle, the stop lever 223S is mechanically actuated so as to initiate operation of the plate loading and unloading means. When this operation has been substantially completed, the stop lever 208S is mechanically operated so as to cause operation of the plate packer 153.

Figure 7:
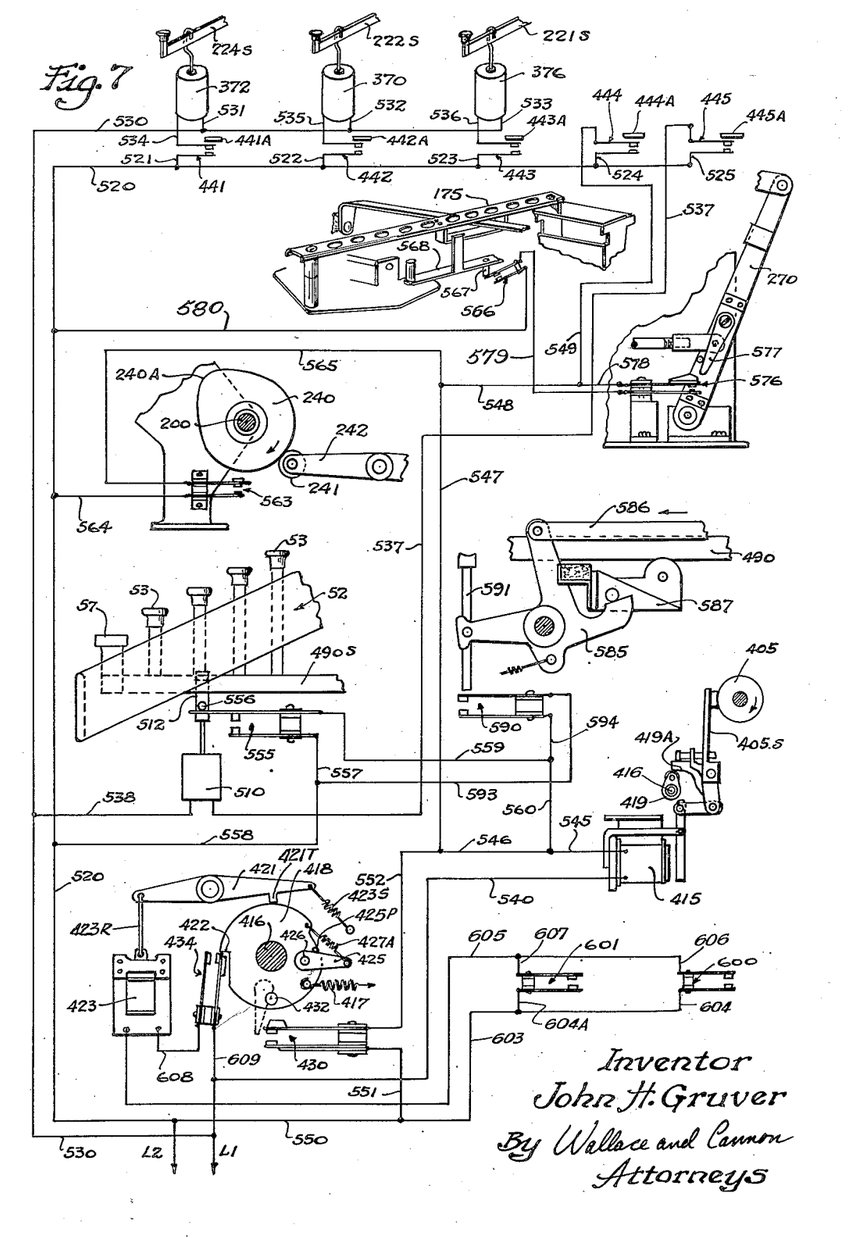
Fig. 7 is a schematic wiring diagram illustrating the control connections.

Another such mechanical inter-relation is effective when actuation of the stop lever 224S causes operation of the carriage return means. When the carriage return movement is substantially complete, the stop lever 221S is actuated so as to cause operation of the line spacing means, and such means includes a cam 240, as shown in Fig. 7, which in its operation is effective on a mechanical transmitting lever 242 that operates the line space mechanism on the carriage 65.

The stop lever 221S is arranged for operation by a solenoid 376, the stop lever 222S by a solenoid 370, and the stop lever 224S by a solenoid 372, as described in my aforesaid copending application, and the other two stop levers 208S and 223S are in every instance mechanically actuated in the sequence and relation described in such copending application.

In the foregoing description the various structural elements of the embossing machine 50 have been identified by the same reference characters as in my aforesaid copending application so as to thereby simplify cross reference, and the relationship of these elements to the reader unit and the intermediate unit will now be described.

Figure 4:
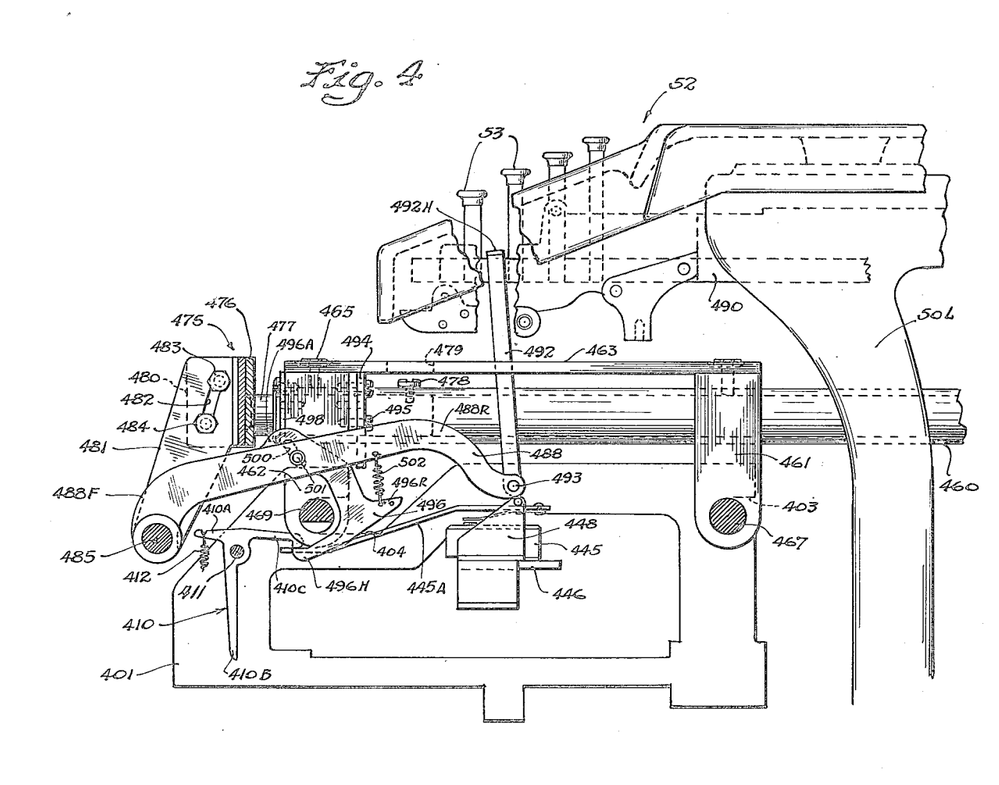
Fig. 4 is a fragmentary vertical sectional view illustrating the manner in which the reader unit and the embossing unit are inter-related by the intermediate unit.

The record reading unit 40 that is utilized is a slightly modified commercially available unit designed and usually used to control linecasting and composing machines and made by Teletype Corportion of Chicago, Illinois. This unit is of substantially the construction shown in Walden Patent No. 2,006,848, patented July 2, 1935, Gaety et al. Patent No. 2,006,860, patented July 2, 1935, Theienemann Patent No. 2,060,838, patented November 17, 1936, and Krum et al. Patent No. 2,091,286, patented August 31, 1937. The reading unit that is thus afforded has a relatively rigid base plate 400 having upstanding end frames 401 and 402 at opposite ends thereof, and rearwardly opening slots 403 and 404 formed in each of the end frame members 401 and 402 enable these frame members to be engaged with suitable supporting elements as will hereinafter be described. At its right hand end the base plate 400 has a supplemental mounting platform 400A upon which driving and control means are supported. Thus tape sensing station S is afforded through which a perforated tape bearing coded data may be fed in a step by step manner as set forth in the aforesaid patents. The tape feeding and sensing means are driven from a motor M1 through a one-revolution clutch 405 which acts in each engaged cycle thereof to drive the tape feeding and sensing means, and the mechanism controlled thereby, through a single cycle of operation. As explained in the aforesaid patents, the sensing means at sensing station S are effective to control setting movement of a plurality of code bars 407 so that in each cycle, the code bars 407 cause actuation of a selected one of a plurality of operating rockers 410. These operating rockers 410 are generally T-shaped in form and are pivoted in a spaced side by side relation along a mounting shaft 411 that extends between the end frames 401 and 402 adjacent the forward upper edge thereof as shown in Fig. 4. The rockers 410 each have a forwardly projecting arm 410A to which a return spring 412 is attached to urge the parts to the normal position of Fig. 4, while a downwardly projecting arm 410B is afforded to which the actuating force is applied under control of the code bars 407 to rock the selected rocker 410 in a clockwise direction against the force of the spring 412. A third arm 410C projects rearwardly at a level just above the shaft 411, and it is this arm 410C that is utilized in applying the movement of the rocker to a part to be actuated.

Figure 2:
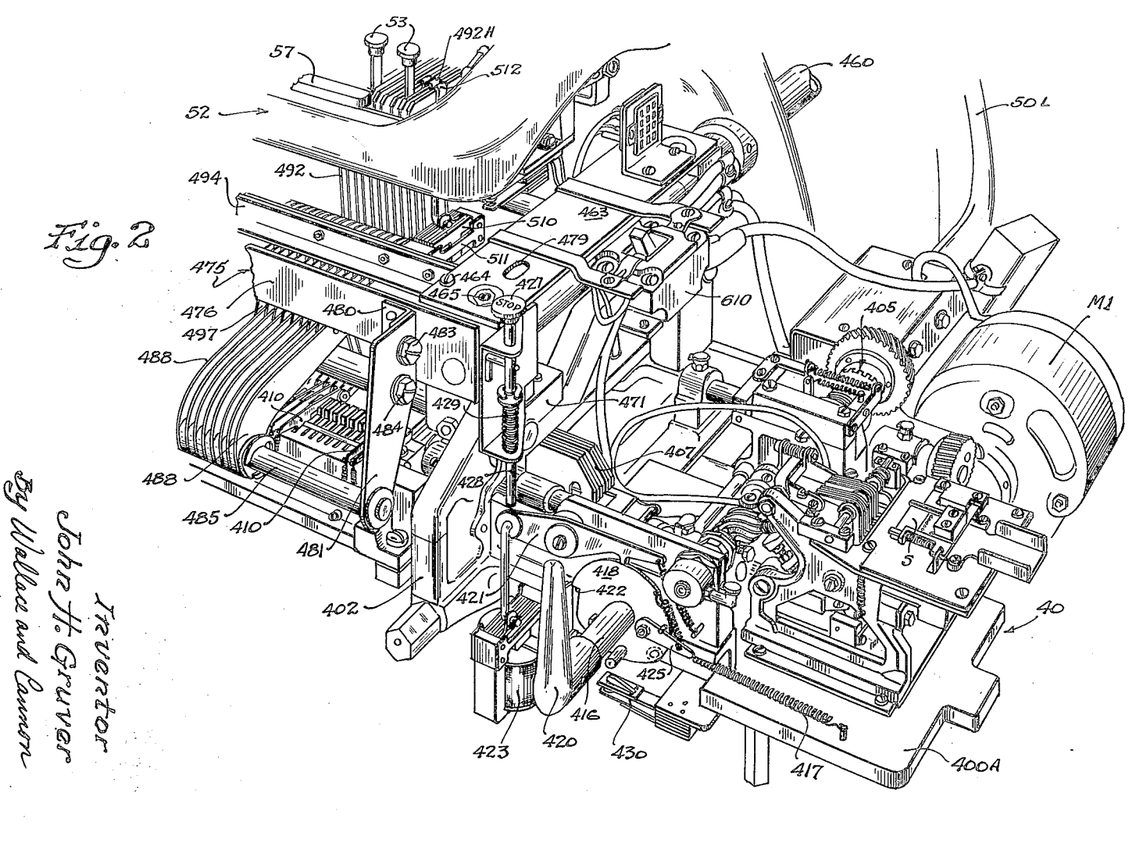
Fig. 2 is a fragmentary perspective view taken from another angle and showing another portion of the machine.
Figure 3:
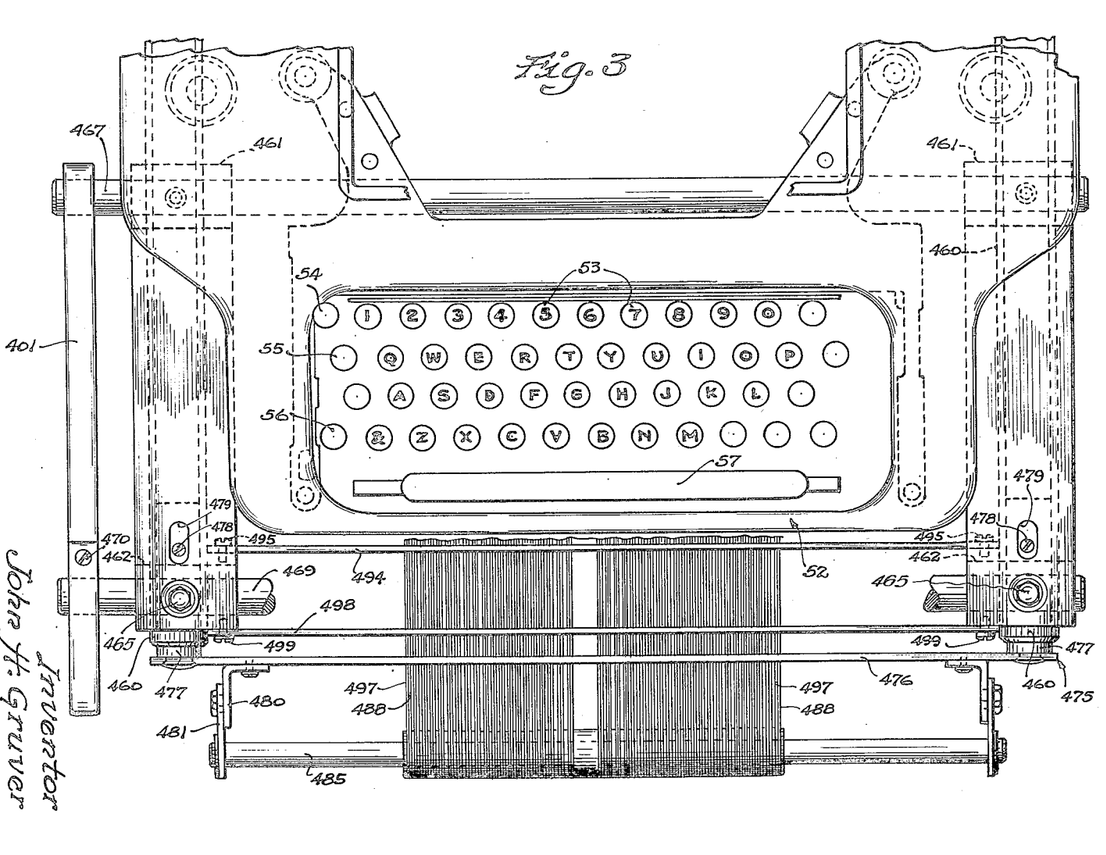
Fig. 3 is a plan view of a part of the mechanism.

The clutch 405 has a normally effective stop lever 405S associated therewith as shown in Fig. 7, this stop lever corresponding in form and function with the stop lever 107 of the aforesaid Walden patent, and when this stop lever 405S is to be momentarily released so as to cause a one cycle operation of the clutch, a solenoid 415, Fig. 7, is energized, as will hereinafter be described. In attaining the desired control of the clutch solenoid 415, a shaft 268 shown in the aforesaid Krum et al. Patent No. 2,091,286, is replaced by a control shaft 416, and a spring 417 acting on a disk 418 fixed on the shaft 416, normally urges the shaft in a counter-clockwise direction to the position shown in Figs. 2 and 7. The shaft 416 has a lever 420 fixed on its forward end, and when the machine is to be started, the lever 420 is moved in a clockwise direction through substantially ninety degrees until a latch lever 421 has tooth 421T thereof engaged with a notch 422 in the disk 418. When the shaft 416 is in its latched position a lever 419, Fig. 7, that is fixed on the shaft 416, is displaced from the position shown in Fig. 7, so as to thereby free the stop lever 405S for releasing operation by its solenoid 415. The lever 419 corresponds to the lever 269 of the aforesaid Krum et al. patent, and when the shaft 416 is unlatched a roller on the lever 19 engages a cam surface 419A on the stop lever 405S, thereby to lock the stop lever as described in the Krum et al. patent. The latch 421 may be released, as will hereinafter be described, by a solenoid 423 that is connected by a rod 423R to the left hand end of the latch 421 so as to act against the spring 423S which urges the latch 421 to its effective position. A manual release button 427 mounted on the right hand side of the intermediate unit 45, Fig. 2, is arranged so that the lower end of its stem 428 overlies the left end of the latch 421, and this button may be manually actuated to release the latch 421, thereby to cause the control shaft 416 to return to its initial position of Figs. 1 and 7. The control shaft 416 is utilized in initiating a tape-reading operation of the reading unit 40, and while its functioning in this regard will hereinafter be described in detail, it may here be pointed out that an arm 425 pivoted at 426 on the disk 418 is normally urged in a counter-clockwise direction by a spring 427A to the position determined by a pin 425P on the disk. When the control shaft 416 is moved clockwise to its latched position the arm 425 passes over and momentarily closes a control switch 430 which energizes the clutch solenoid 415 as will hereinafter be described in detail, thereby to advance the tape to its next position at sensing station S and cause automatic machine operation as will be described. In its return movement when the shaft 416 is unlatched, the lever arm 425 passes yieldingly over the switch 430 without closing the switch.

The setting of the control shaft 416 in its latched position also shifts a pin 432 on the disk 418 into contact with a switch 434 so as to close the same and maintain it closed so long as the shaft 416 remains latched. This switch 434 serves to condition a safety control circuit as will hereinafter be described.

Figure 5:
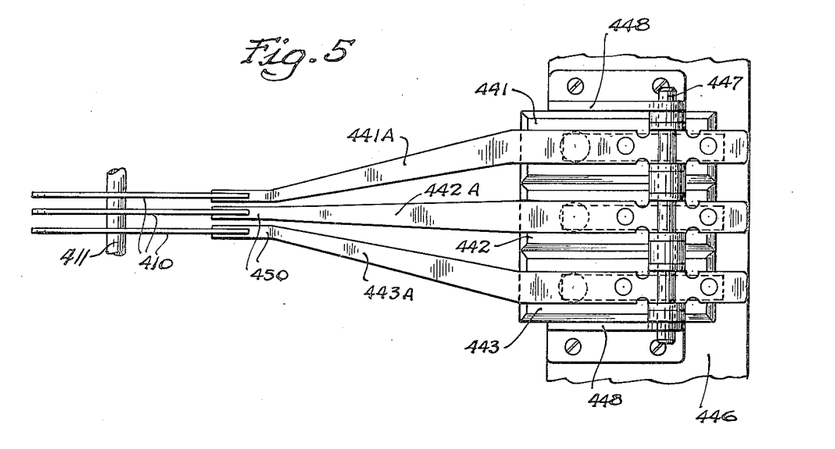
Figs. 5 and 6 are fragmentary plan and vertical sectional views showing the manner in which certain electrical controls are afforded.
Figure 6:
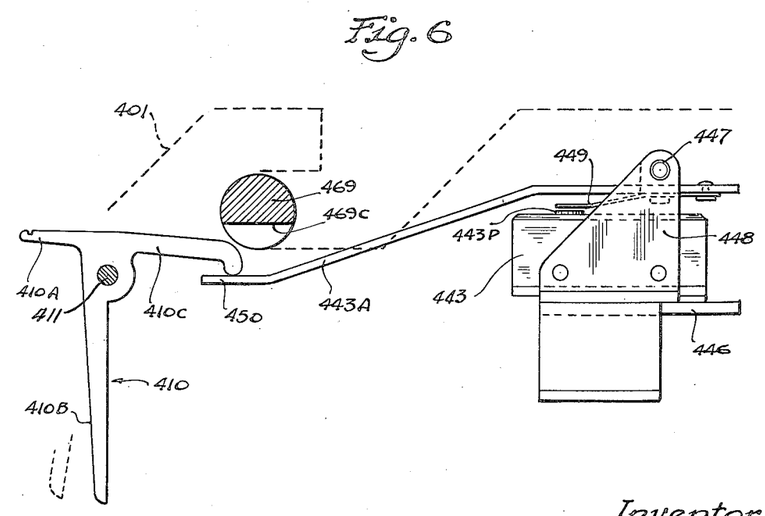

A further modification in the structure of the reader unit involves the provision of a plurality of control switches 441, 442, 443, 444 and 445 shown in Fig. 7, and arranged for closure by certain of the rockers 410 in the manner shown in Figs. 4, 5 and 6. Thus all of these switches are mounted as shown in Figs. 1 and 4 to 6 on the top of a mounting bracket 446 which is extended between the end frames 401 and 402. The switches 441 to 445 are of the normally open, plunger-operated type, and as shown in Fig. 6, the switch 443 has a plunger 443P extended upwardly from the body of the switch. Actuating arms 441A to 445A are afforded for the respective switches 441 to 445, and these arms are pivotally supported on shafts 447 which are in turn mounted in upstanding ears 448 fixed on the bracket 446. Each arm 441A to 445A has a resilient arm 449 which bears on the related switch plunger, as shown in Fig. 6, so as to enable counter-clockwise rocking movement of the arm to resiliently actuate the related switch plunger. The arms 441A to 445A are extended downwardly and have horizontal forward ends 450 that are disposed beneath selected rockers 410 so that the arms 441A to 445A may be actuated thereby.

Under the present invention the reader unit 40 that is thus afforded may readily and easily be associated with the embossing unit 50 by means of the intermediate unit 45, which as shown in Figs. 1, 2, 3 and 4, is permanently associated with the embossing unit 50 and is adapted for detachable operative association with the reader unit 40. Thus the intermediate unit 45 comprises a pair of rigid supporting tubes 460 extended horizontally through the right and left hand pairs of legs 50L and forwardly from the front legs beneath the opposite edges of the keyboard 52 and somewhat beyond the forward edge of the keyboard. On and encircling each tube 460 a pair of spaced downwardly projecting blocks 461 and 462 are mounted, the block 461 being disposed just forwardly of the forward leg 50L in which the tube is mounted, while the block 462 is disposed near the forward end of the tube. The blocks 461 and 462 on each tube 460 are held in a spaced relation corresponding substantially to the spacing of the ends of the slots 403 and 404, and this is accomplished by top plates 463 secured by screws 464 to the tops of the respective blocks 461 and 462. Set screws 465 extended through the plates 463 and the blocks 461 and 462 engage the tubes 460 to hold the sets of blocks in position thereon.

The lower ends of the blocks 461 have a support rod 467 extended therethrough so as to project at its opposite ends beyond the blocks 461, and screws 468 secure the rod 467 in position in the blocks 461. A similar rod 469 is similarly mounted and secured in the lower ends of the blocks 462. The projecting ends of the rods 467 and 469 may thus be engaged by the slots 403 and 404 of the end frames 401 and 402 of the reader unit 40, such movement involving an initial upward movement of the reader unit 40 to dispose the rear ends of the slots 403 and 404 horizontally opposite the respective rods 467 and 469, and subsequent rearward movement of the unit 40 to locate the slots 403 and 404 in an embracing relation with respect to the rods 467 and 469. A retaining screw 470, Fig. 1, is then put in position in the frame 401, and a block 471, Fig. 2, is secured in place by screws or the like on the frame 402 so as to engage the rod 469 and thereby hold the unit 40 in place on the supporting rods.

When the reader unit 40 is thus supported in position, the rockers 410 thereof are operatively related to motion transmitting mechanism forming part of the intermediate unit 45 and by means of which the motion of any selected rocker 410 is transmitted to the related key 53 or the like so as to actuate the same and cause corresponding operation of the related mechanism of the embossing machine 50. In affording a mounting for such motion transmitting means a carrier 475 is shiftably mounted forwardly of the block 462. This carrier 475 comprises an elongated mounting plate 476 disposed in a vertical plane and having its opposite ends disposed opposite the open forward ends of the support tubes 460. At such opposite ends, mounting rods 477 are fixed to the plate 476 so as to extend rearwardly and with a snug sliding fit into the forward ends of the tubes 460. The rods 477 may be held in their forward position of Fig. 4 by lock screws 478 extended downwardly through the tubes 460 and entering tapped positioning bores formed radially at accurately located points in the rods 477. Clearance or access slots 479 are formed in the plates 463 to enable the screws 478 to be released or tightened as required. On its forward face, and near the ends thereof, the mounting plate 476 has a pair of angle brackets 480 secured in fixed position, and each of these brackets 480 carries an arm 481 that extends forwardly and downwardly therefrom. In attaining such mounting of the arms 481, each arm 481 has an inclined but generally vertical slot 482 formed therein near its upper end. A pair of screws 483 and 484 are passed through the slot 482 at and in engagement with opposite ends thereof, and these screws are threaded into the forwardly projecting flange of the adjacent angle bracket 480 so as to thereby rigidly clamp the arm 481 to such bracket.

Between the lower ends of the arms 481, a pivot shaft 485 is extended and this shaft serves as a pivot for the forward ends of a plurality of transmitting levers 488. One such lever 488 is afforded for each key 53 that is to be actuated, and each such lever 488 is so disposed along the shaft 485 that its rear end is located substantially beneath the lever 490 which carries the key 53 with which it is to be associated. Thus, at the rear end of each such transmitting lever 488, the lower end of a connecting link 492 is pivoted at 493, Fig. 4, and the upper end of the link 492 has a return bend hook 492H formed thereon which extends around the related key lever 490. This enables downward movement of the link 492 to actuate the connected key 53 while at the same time allowing the key to be manually actuated when this is necessary.

In order that ample clearance may be afforded for the desired movements of the levers 488 with respect to the rod 469, and to simplify the guiding thereof, the levers 488 have the end portions thereof formed as arcuate arms 488F and 488R, Fig. 4, and thus the relatively straight intermediate portions thereof are disposed in upwardly spaced relation with respect to the rod 469. Moreover, the straight portions of the levers 488 are disposed between the downwardly extending teeth of a comb plate 494 which is disposed in a vertical plane rearwardly of the rear faces of the blocks 462. Means such as screws 495 secure the comb plate 494 in position on the rear faces of the blocks 462.

The transmitting levers 488 are arranged to be yieldingly connected to and actuated by the related rockers 410 and for this purpose each lever 488 has a hook lever 496 mounted at one side thereof. Such hook lever 496 is pivoted on the shaft 485 beside its related lever 488 and extends rearwardly in the same general form for some distance. The hook lever 496 then has an upward projection 496A that extends between the teeth of a guiding comb bar 498 which is secured by screws 499 to the forward faces of the blocks 462. An arcuate slot 500 in the lever 496 is centered on the shaft 485 and a headed guide pin 501 extends through the slot 500 and being fixed in the related transmitting lever 488 serves to hold these members together laterally while at the same time allowing some lost motion therebetween.

Each hook lever 496 has a downwardly and rearwardly extended rear end 496R and a coiled tension spring 502 is extended upwardly therefrom and connected to the related lever 488. Thus any downward rocking movement of the hook lever 496 is yieldingly transmitted to the lever 488 so as to actuate the connected key 53. To enable the hook lever 496 to be thus actuated, the portion 496R has a hook portion 496H extended forwardly therefrom into position beneath the forward end of the rocker arm 410C of the related rocker.

It will be observed that adequate clearance is provided for the movements of the levers 488 since the switches 441 to 445 are mounted in groups disposed beyond the end edges of the keyboard 52, as will be evident with respect to the switch 441 in Fig. 1.

The mounting and arrangement of the transmitting and hook levers 488 and 496 and their relation to the keys 53 serves to materially simplify the assembly and disassembly of the reader unit 40 with respect to the embossing machine. Thus when the reader unit 40 is to be removed, the set screws 478 are loosened, and the carrier 475 is moved rearwardly till the plate 476 engages the forward ends of the mounting tubes 460. This serves to move the hook elements 496H rearwardly of the arms 410C of the rockers, and it will be observed that in this movement the links 492 may pivot at their upper ends with respect to the key levers 490, and at their lower ends by reason of their pivotal connection 493 with the levers 488. Then, in order to afford clearance for the forward withdrawal of the reader unit 40, and particularly to clear the rockers 410, the shaft 485 is raised by loosening the supporting arms 481. Thus the lower screw 484 is removed from each arm 481, and each screw 483 is unclamped. The shaft 485 is then elevated until the lower ends of the slots 482 engage the screws 483, and the screws 483 are then clamped. The upward movement of the hook elements 496H is permitted in this instance by cutting away the bottom portion of the rod 469, as indicated at 469C in Fig. 6. Moreover, the spacing of the rear edges of the arms 481 with respect to the front face of the plate 476, enables the upward movement of the arms 481 to take place despite the angular position of the slots 482. The upward movement of the shaft 485 disposes this shaft 485 and the bearing portions of the levers 488 and 496 above the level of the rockers 410, and hence upon removal of the retaining screw 470 and the retaining block 471, the reader unit may readily be removed. The mounting of the unit 40 may, of course, be readily accomplished by reversal of the foregoing sequence of operations.

The operation of the reader unit in each reading cycle serves, as hereinbefore described, to actuate the selected one of the rockers 410, and this serves through the levers 488 and 496 to mechanically actuate the selected or related key 53 and thereby cause the embossing unit to operate through an embossing cycle. With respect to the space bar 57, however, a solenoid 510, Figs. 2 and 7, is provided which is mounted by means of a bracket 511 on the comb bar 494 as shown in Fig. 2. The armature of the solenoid 510 has a hook-shaped link 512 extended upwardly therefrom and hooked over one of the arms 490S which support the space bar 57, and hence when the solenoid 510 is energized, the space bar 57 is actuated to cause character spacing of the carriage of the embossing unit. Such energization of the solenoid 510 is effected under control of the switch 445 that is, in turn, closed by the reader unit 40 in response to the sensing of a character spacing indication on the control tape or the like.

In Fig. 7 of the drawings the controlling interrelation of the elements of the intermediate unit, the embossing unit and the reader unit has been schematically illustrated. Thus the power for the various electrically operated control elements is supplied by power lines L1 and L2, the line L2 being connected by a wire 520 and branch leads 521, 522, 523, 524 and 525 to one contact of each of the respective switches 441 to 445. A wire 530 is extended from the line wire L1 and branch leads 531 to 533 from the wire 530 are extended to one terminal of each of the respective solenoids 372, 370 and 376. From the other terminals of the respective solenoids 372, 370 and 376, wires 534, 535 and 536 are extended to the other contacts of the respective switches 441, 442 and 443 so as to place these solenoids under the control of the switches with which they are thus associated. The other contact of the character space switch 445 is connected by a wire 537 to one terminal of the character spacing solenoid 510, the other terminal thereof being connected by a wire 538 to the wire 530, and thus the solenoid 510 is placed under the control of the switch 445.

The other switch 444 is what has been termed the "rub-out" switch, since it is actuated in response to the sensing of a code indication which includes all of the index positions of the code that is employed in the control tape or the like. This rub-out code is formed when a mistake has been made in the tape perforation, and in response to such rub-out code it is merely desirable to advance the tape to another character position with respect to the sensing station S of the reader unit 40. The switch 444 is therefore arranged to close an energizing circuit for the clutch control solenoid 415, as will now be described in connection with the description of the other circuits that perform a similar function.

Thus, one terminal of the solenoid 415 is connected by a wire 540 to the line wire L1, while wires 545, 546, 547, 548 and 549 in series extend to the other contact of the rub-out switch 444. A similar energization of the clutch solenoid 415 may be attained by closure of the switch 430 when this switch is momentarily closed in the course of a movement of the control shaft 416 to its latched position. Thus, wires 550 and 551 extend in series from the line wire L2 to one contact of the switch 430 while a wire 552 extends from the other contact of the switch 430 to the wire 546 which through the wire 545 is connected to one terminal of the clutch solenoid 415.

Similar circuits are closed to the clutch solenoid 415 when a line spacing operation, a character spacing operation, a plate feeding and ejecting operation, or an embossing operation has been completed. Thus a switch 555 is arranged to be closed by a pin 556 carried on the link 512 whenever the solenoid 510 is operated to cause a character space operation. One contact of the switch 555 is connected by wires 557 and 558 in series with the wire 520, while wires 559 and 560 extend in series from the other contact of the switch 555 to the wire 545.

In attaining the desired energization of the clutch solenoid 415 after a line space operation, use is made of the line space cam 240 of my aforesaid copending application, which as there shown, operates on a roller 241 to actuate a lever 242. After the lobe 240A of such cam has fully actuated the lever 242, the lobe is arranged to engage and close a switch 563, and one contact of this switch is connected by a wire 564 to the wire 520 while the other contact is connected by a wire 565 to the wire 547 so as to thereby afford another parallel energizing circuit for the clutch solenoid 415.

With respect to the plate feeding and ejecting operations, a circuit is provided which is closed only when both such operations have been completed. Thus a normally open switch 566 is arranged to be closed by a pin 567 carried on a switch operating lever 568, Figs. 1 and 7, this lever being pivoted at 569 on the mounting plate 177 of the embossing machine shown in my aforesaid copending application. The lever 568 is spring biased rearwardly, and an upstanding ear 570 on the lever 568 is disposed in the path of a guide element on the ejecting lever 175, and the arrangement is such that when the lever 175 has completed an ejecting stroke, the switch 566 is closed. Another normally open switch 576 is mounted adjacent to the plate feed lever 270 of the embossing machine, and a one-way pawl 577 carried on the lever 270 is arranged to engage and close the switch 576 as the lever 270 approaches its home position in the return or clockwise rocking movement thereof. One contact of the switch 576 is connected by a wire 578 to the wire 548, while a wire 579 connects the other contact of the switch 576 to one contact of the switch 566. The other contact of the switch 566 is connected by a wire 580 to the wire 520, so that when the switches 566 and 576 are both closed, the clutch solenoid 415 will be energized to institute another cycle of the reading unit.

When a key 53 has been actuated, a similar circuit to the clutch solenoid 415 is closed at substantially the end of the embossing cycle. In attaining this operation, use is made of the key restoring means disclosed in Duncan et al. Patent No. 1,831,103, patented November 10, 1931. Such mechanism is included in the embossing machine 50 and, as shown in Fig. 7, comprises a rocker 585 corresponding to the rocker 120 of the aforesaid Duncan et al. patent. Near the end of an embossing cycle the rocker 585 is actuated in a counterclockwise direction by a link 586, as described in said Duncan et al. patent, so as to act on a key restoring rocker 587 to lift or restore the key 53 that has been depressed, and the counterclockwise rocking movement of the rocker 585 is utilized to close a switch 590. Thus a screw 591 in a forwardly projecting arm of the rocker 585 is arranged to engage and close the switch 590 when the rocker 585 is actuated; and upon such switch closure the clutch solenoid 415 is energized. The necessary circuit is provided by connecting the opposed contacts of the switch 590 to the wires 558 and 560, respectively, by wires 593 and 594.

Safety circuits are provided for stopping the machine when the supply of control tape, or the supply of blank printing plates P has been exhausted; and for this purpose conventional sensing switches are afforded in connection with the sensing station S and the supply magazine M. These switches are shown in Fig. 7 as switches 600 and 601, and a wire 603 and branches 604 and 604A connect the wire 559 to one contact of each of these switches. A wire 605 and branches 606 and 607 extend from one terminal of the stop solenoid 423 to the other contacts of the respective switches 600 and 601. The other terminal of the solenoid 423 is connected by a wire 608 to one contact of the switch 434, while a wire 609 extends from the other contact of the switch 434 to the line wire L1. Thus when conditioned by closure of the switch 434, either of the safety switches 600 or 601 may, when closed, cause energization of the stop solenoid 423 so as to thereby unlatch the control shaft 416.

When the control shaft 416 is thus unlatched, the counterclockwise movement of the arm 419 engages the cam surface 419A so as to thereby prevent actuation of the stop lever 405S to its released position. Operation of the machine is thereby stopped, and will not be resumed until the control shaft 416 is again shifted to its latched position.

The driving motors of the embossing unit 50 and the reader unit 40 are controlled by a common main switch 610, Fig. 2, and appropriate plug connections are afforded in a conventional manner to enable ready separation of the units as hereinabove described.

From the foregoing description it will be evident that the present invention enables automatic control of an embossing machine to be readily and easily attained, and that the present invention simplifies the association of an automatic record reading control mechanism with an embossing machine. Moreover, the present invention enables a commercially available record reading and control mechanism to be utilized with but few changes of structure, thereby to simplify the problem of affording an automatically controlled embossing machine for printing plates and the like.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In an automatic record controlled embossing machine, an embossing unit having a plurality of settable pairs of punches and dies, power operated plate handling means including means for loading and unloading printing plates, character spacing means and power operated line spacing means for imparting movements to such plates with respect to an embossing position in the machine, and control means including a space bar for controlling said character spacing means and a plurality of control keys for selectively setting and causing embossing operation of said pairs of punches and dies, a record controlled governing unit including a plurality of rockers allocated one to each key of said machine and one to said space bar and one to each of said power operated means, a single cycle drive means for said governing unit, a record reading means operable in each such cycle to read a predetermined portion of a record, and means responsive to such reading means to actuate said rockers selectively, and an intermediate unit having a plurality of transmitting levers allocated to the respective keys of said machine and each having a transmitting link connected to the key to which such lever is allocated, a hook element for each such lever having a yielding lost motion connection with its lever for actuating the same, each of said hook elements being operatively engaged with the related one of said rockers for actuation thereby, control connections between said power operated means, said space bar and the respective rockers allocated thereto, control means for said single cycle drive means of said governing unit for initiating a single cycle of operation thereof, and means for governing said last mentioned control means and operable by either said plate loading means, said line spacing means, or said space bar or as an incident to release of any one of said keys to cause operation of said single cycle drive means of said governing unit.

2. In an automatic record controlled embossing machine, an embossing unit having a plurality of settable pairs of punches and dies, power operated plate handling means including means for loading and unloading printing plates, power operated line spacing means, electrically actuated control means for the respective power operated means, electrically actuated character spacing means, and control means including a plurality of control keys for selectively setting and causing embossing operation of said pairs of punches and dies, a record controlled governing unit including a plurality of rockers allocated one to each key of said machine and also having other rockers allocated one to each of said electrically actuated control means and to said electrically actuated character spacing means, a single cycle drive means for said governing unit, a record reading means operable in each such cycle to read a predetermined portion of a record, and means responsive to such reading means to actuate said rockers selectively, and an intermediate unit having a plurality of transmitting levers allocated to the respective keys of said machine and each having a transmitting link connected to the key to which such lever is allocated, a hook element for each such lever having a yielding lost motion connection with its lever for actuating the same, said hook elements being operatively engaged with the related ones of said rockers for actuation thereby, individual switch means operable selectively by said other rockers and having energizing circuits associated respectively therewith to selectively energize said electrically actuated means, electrically operable control means for said single cycle drive means of said governing unit for initiating a single cycle of operation thereof, and means including energizing circuits for governing said last mentioned electrically operated control means and operable by either said plate loading means, said line spacing means, said character spacing means or as in incident to release of any one of said keys to cause operation of said single cycle drive means of said governing unit.

3. In an automatic record controlled embossing machine, an embossing unit having a plurality of settable pairs of punches and dies, power operated plate handling means including means for loading and unloading printing plates, power operated line spacing means, electrically actuated control means for the respective power operated means, electrically actuated character spacing means, and control means including a plurality of control keys for selectively setting and causing embossing operation of said pairs of punches and dies, a record controlled governing unit including a plurality of rockers allocated one to each key of said machine and also having other rockers allocated one to each of said electrically actuated control means and to said electrically actuated character spacing means, a single cycle drive means for said governing unit, a record reading means operable in each such cycle to read a predetermined portion of a record, and means responsive to such reading means to actuate said rockers selectively, and an intermediate unit having a plurality of transmitting levers allocated to the respective keys of said machine and each having a transmitting link connected to the key to which such lever is allocated, a hook element for each such lever having a yielding lost motion connection with its lever for actuating the same, said hook elements being operatively engaged with the related ones of said rockers for actuation thereby, individual switch means operable selectively by said other rockers and having energizing circuits associated respectively therewith to selectively energize said electrically actuated means, electrically operable control means for said single cycle drive means of said governing unit for initiating a single cycle of operation thereof, means including energizing circuits for governing said last mentioned electrically operated control means and operable by either said plate loading means, said line spacing means, said character spacing means or as an incident to release of any one of said keys to cause operation of said single cycle drive means of said governing unit, and another switch arranged for closure by still another one of said rockers and having a control circuit governing said last mentioned electrically operated control means.

4. In an automatic record controlled embossing machine, an embossing unit having a plurality of settable pairs of punches and dies, a plurality of power operated plate handling and shifting means, and control means including a plurality of control keys for selectively setting and causing embossing operation of said pairs of punches and dies, a record controlled governing unit including a plurality of rockers allocated one to each key of said machine and one to each of said power operated means, a single cycle drive means for said governing unit, a record reading means operable in each such cycle to read a predetermined portion of a record, and means responsive to such reading means to actuate said rockers selectively, and an intermediate unit having a plurality of transmitting levers allocated to the respective keys of said machine and each having a transmitting link connected to the key to which such lever is allocated, a hook element for each such lever having a yielding lost motion connection with its lever for actuating the same, each of said hook elements being operatively engaged with the related one of said rockers for actuation thereby, control connections between said power operated means and the respective rockers allocated thereto, control means for said single cycle drive means of said governing unit for initiating a single cycle of operation thereof, and means for governing said last mentioned control means and operable by any one of said power operated means as an incident to completion of an operation thereof to cause operation of said single cycle drive means of said governing unit.

5. In an automatic record controlled embossing machine, an embossing unit having a plurality of settable pairs of punches and dies, a plurality of electrically controlled power operated plate handling and shifting means, and a plurality of control keys for selectively setting and causing embossing operation of said pairs of punches and dies, a record controlled governing unit including a plurality of rockers allocated one to each key of said embossing unit and also having other rockers allocated one to each of said electrically controlled means, a single cycle drive means for said governing unit, a record reading means operable in each such cycle to read a predetermined portion of a record, and means responsive to such reading means to actuate said rockers selectively, and an intermediate unit having a plurality of transmitting levers allocated to the respective keys of said machine and each having a transmitting link connected to the key to which such lever is allocated, a hook element for each such lever having a yielding lost motion connection with its lever for actuating the same, said hook elements being operatively engaged with the related ones of said rockers for actuation thereby, individual switch means operable selectively by said other rockers and having energized circuits associated respectively therewith to selectively energize said electrically controlled means, electrically operable control means for said single cycle drive means of said governing unit for initiating a single cycle of operation thereof, and means including energizing circuits for governing said last mentioned electrically operated control means and operable by any one of said power operated means to cause operation of said single cycle drive means of said governing unit.

6. In an automatic record controlled embossing machine, an embossing machine having a plurality of settable pairs of punches and dies, a magazine for containing a supply of printing plates, power operated plate handling means including means for loading and unloading printing plates, character spacing means and power operated line spacing means for imparting movements to such plates with respect to an embossing position in the machine, and control means including a space bar for controlling said character spacing means and a plurality of control keys for selectively setting said pairs of punches and dies, a record controlled governing unit including a plurality of selectively operable actuators operatively associated with the respective keys and said space bar and with each of said power operated means, a single cycle drive means for said unit, a record reading means operable in each such cycle to read a predetermined portion of a record, and means responsive to such reading means to operate said actuators selectively, control means for said single cycle drive means of said governing unit for initiating a single cycle of operation thereof, means for governing said control means and operable by either said plate loading means, said line spacing means, said space bar or as an incident to release of any one of said keys to cause operation of said single cycle drive means of said governing unit, a control shaft normally disposed in a stop position and having means associated therewith operable in said stop position of said shaft to disable said single cycle drive means, means for latching said shaft in a start position, means operable as an incident to shifting of said shaft from said stop position to said start position to cause operation of said single cycle drive means, and means operable in response to lack of a supply of printing plates to release said latch means so as to cause return of said control shaft to its stop position.

7. In an automatic record controlled embossing machine, an embossing machine having a plurality of settable pairs of punches and dies, a magazine for holding a supply of printing plates, power operated plate handling means including means for loading and unloading printing plates, character spacing means and power operated line spacing means for imparting movements to such plates with respect to an embossing position in the machine, and control means including a space bar for controlling said character spacing means and a plurality of control keys for selectively setting said pairs of punches and dies, a record controlled governing unit including a plurality of actuators allocated and operatively associated one to each key of said machine and one to said space bar and one to each of said power operated means, a single cycle drive means for said governing unit, a record reading means operable in each such cycle to read a predetermined portion of a record, and means responsive to such reading means to operate said actuators selectively, control means for said single cycle drive means of said governing unit for initiating a single cycle of operation thereof, means for governing said control means and operable by either said plate loading means, said line spacing means, said space bar or as an incident to release of any one of said keys to cause operation of said single cycle drive means of said governing unit, a control element shiftable between a normal stop position and a start position, means operable by said control element as it is shifted to said start position to cause operation of said single cycle drive means, means associated with said control element and operable in the stop position of said control element to disable said single cycle drive means, sensing means for sensing the presence or absence of a supply of printing plates in said magazine, means operable by said control element to render said sensing means effective when said control element is in said start position and to disable said sensing means when said control element is in stop position, a latch for holding said control element in said start position, and means governed by said sensing means and operable when a lack of printing plates is sensed in said magazine to release said latch.

8. An intermediate unit for enabling a code reading and translating unit having a plurality of selectively operable actuating rockers to be operatively associated with a key-operated embossing machine in which a main frame has a forwardly projecting keyboard, said intermediate unit comprising a pair of supporting members adapted to project stationarily, and in a forward direction, from the main frame of such an embossing machine and beneath opposite side edges of the keyboard thereof, downwardly extended supporting elements carried by the projecting portions of said members and adapted to engage such a code reading and translating unit in a supporting relation thereto, a horizontal pivot shaft disposed forwardly and downwardly with respect to the forward ends of said members, means supporting said pivot shaft for rearward movement and subsequent upward movement from a lower forward position to an upper rear position, means for releasably securing said pivot shaft in either of said positions, a plurality of transmitting levers and a plurality of hook levers pivoted at their forward ends on said pivot shaft and extended rearwardly therefrom, said hook levers having hook elements extended downwardly at a point intermediate the ends of said transmitting levers and then forwardly, said levers being arranged in pairs each having one transmitting lever and one hook lever, means affording a yielding lost motion connection of limited range between the levers of each pair, and a plurality of transmitting links pivotally connected at their lower ends to the rear ends of the respective transmitting levers and having reversely bent hooks at their other ends for operative engagement with the respective keys of such a keyboard.

9. An intermediate unit for enabling a code reading and translating unit having a plurality of selectively operable actuating rockers to be operatively associated with a key-operated embossing machine in which a main frame has a forwardly projecting keyboard, said intermediate unit comprising a pair of elongated mounting members adapted to project stationarily, and in a forward direction, from the main frame of such an embossing machine and beneath opposite side edges of the keyboard thereof, downwardly extended elements carried by the projecting portions of said members and having engaging parts thereon adapted to engage a code reading and translating unit in a supporting relation, a carrier extended across and in front of the forward ends of said members and having rearwardly extended support members fixed thereto and slidably related to the forward end portions of the respective mounting members, means acting between said mounting members and said support members for releasably securing said carrier in a forward position, a horizontal pivot shaft mounted in a suspended relation on said carrier for movement between a lower operating position and an upper retracted position, means for securing said pivot shaft in either of said positions, a plurality of transmitting levers pivoted at their forward ends on said pivot shaft and extended rearwardly therefrom, hook elements associated with medial portions of said levers and extended downwardly therefrom and then forwardly, and a plurality of transmitting links pivotally connected at their lower ends to the rear ends of the respective transmitting levers and having reversely bent hooks at their other ends for operative engagement with the respective keys of such a keyboard.

10. An intermediate unit for enabling a code reading and translating unit having a plurality of selectively operable actuating rockers to be operatively associated with a key-operated embossing machine in which a main frame has a forwardly projecting keyboard, said intermediate unit comprising a pair of supporting tubes adapted to project stationarily, and in a forward direction, from the main frame of such an embossing machine and beneath opposite side edges of the keyboard thereof, supporting means carried by and extended downwardly from the projecting portions of said tubes for supporting engagement with a code reading and translating unit, a carrier extended across and in front of the forward ends of said tubes and having stub shafts fixed thereto and extended slidably into the forward ends of said tubes, means for releasably securing said carrier in a forward position, a horizontal pivot shaft mounted in a suspended relation on said carrier for movement between a lower operating position and an upper retracted position, means for securing said pivot shaft in either of said positions, a plurality of transmitting levers pivoted at their forward ends on said pivot shaft and extended rearwardly therefrom, hook elements having a lost motion connection with the respective levers and extended downwardly from an intermediate point along said levers and then forwardly, and a plurality of transmitting links pivotally connected at their lower ends to the rear ends of the respective transmitting levers and having reversely bent hooks at their other ends for operative engagement with the respective keys of such a keyboard.

11. An intermediate unit whereby a code reading and translating unit having a plurality of selectively operable actuating rockers may be operatively associated with a key-operated embossing machine in which a main frame has a forwardly projecting keyboard, said intermediate unit comprising a pair of supporting tubes adapted to project stationarily, and in a forward direction, from the main frame of such an embossing machine and beneath opposite side edges of the keyboard thereof, supporting elements carried by the projecting portions of said tubes and extended downwardly therefrom for supporting engagement with such a code reading and translating unit, a carrier extended across and in front of the forward ends of said tubes and having stub shafts fixed thereto and extended slidably into the forward ends of said tubes, means for releasably securing said carrier in a forward position, a horizontal pivot shaft mounted forwardly of and in a suspended relation on said carrier for movement between a lower operating position and an upper retracted position, means for securing said pivot shaft in either of said positions, a plurality of transmitting levers and a plurality of hook levers pivoted at their forward ends on said pivot shaft and extended rearwardly therefrom, said hook levers having hook elements at their rear ends extended downwardly and then forwardly, said levers being arranged in pairs each having one transmitting lever and one hook lever, means affording a yielding lost motion connection of limited range between the levers of each pair, and a plurality of transmitting links pivotally connected at their lower ends to the rear ends of the respective transmitting levers and having reversely bent hooks at their other ends for operative engagement with the respective keys of such a keyboard.

12. An intermediate unit whereby a code reading and translating unit having a plurality of selectively operable actuating rockers may be operatively associated with a key-operated embossing machine in which a main frame has a forwardly projecting keyboard, said intermediate unit comprising a pair of supporting tubes adapted to project stationarily, and in a forward direction, from the main frame of such an embossing machine and beneath opposite side edges of the keyboard thereof, downwardly extended members carried by the projecting portions of said tubes and having parallel front and rear supporting bars disposed thereon in spaced relation and transversely with respect to said tubes for supporting engagement with such a code reading and translating unit, a carrier extended across and in front of the forward ends of said tubes and having stub shafts fixed thereto and extended slidably into the forward ends of said tubes, means for releasably securing said carrier in a forward position, a horizontal pivot shaft mounted in a suspended relation on said carrier for movement between a lower operating position and an upper retracted position, means for securing said pivot shaft in either of said positions, a plurality of transmitting levers and a plurality of hook levers pivoted at their forward ends on said pivot shaft and extended rearwardly over said front supporting bar, said hook levers having hook elements extended downwardly and then forwardly beneath and in spaced relation to said front supporting bar, said levers being arranged in pairs each having one transmitting lever and one hook lever, means affording a yielding lost motion connection of limited range between the levers of each pair, and a plurality of transmitting links pivotally connected at their lower ends to the rear ends of the respective transmitting levers and having reversely bent hooks at their other ends for operative engagement with the respective keys of such a keyboard.

JOHN H. GRUVER.

REFERENCES CITED

The following references are of record in the file of this patent:

UNITED STATES PATENTS

| Number | Name | Date |
|---|---|---|
| 1,106,397 | McTammany | Aug. 11, 1914 |
| 1,292,944 | Wright | Jan. 28, 1919 |
| 1,688,364 | Thompson | Oct. 23, 1928 |
| 1,930,058 | McCain | Oct. 10, 1933 |